Dec. 30, 1941.　　　　P. FRANTZ　　　　2,267,905
HEATING APPARATUS
Filed Dec. 4, 1939　　　　3 Sheets-Sheet 1
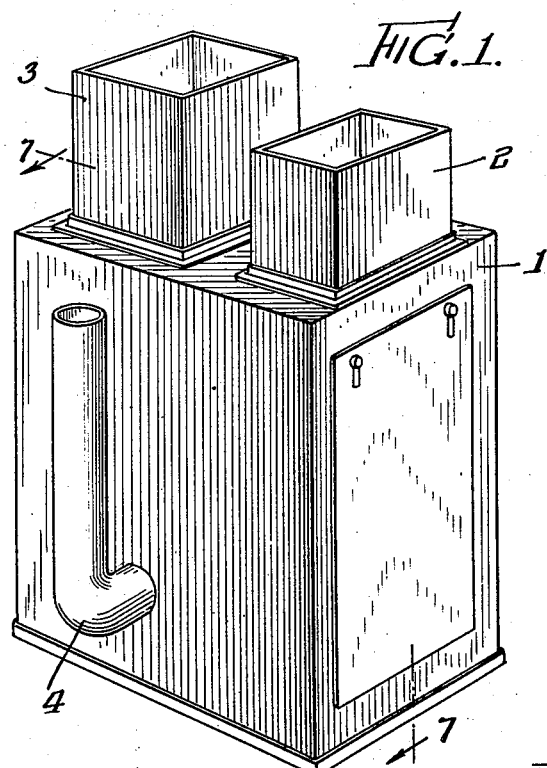
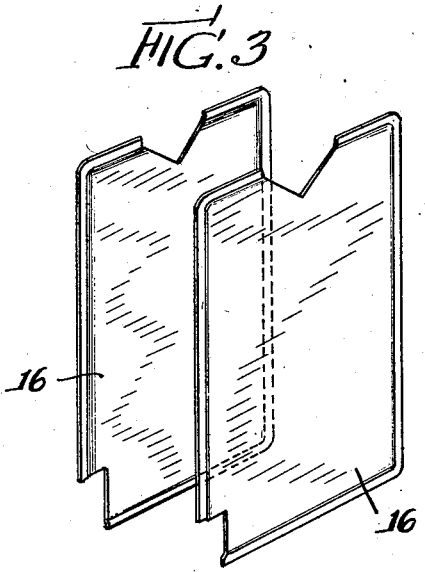
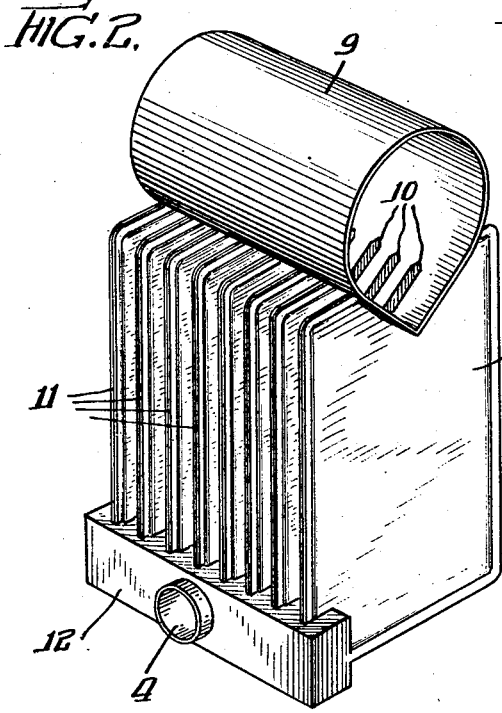
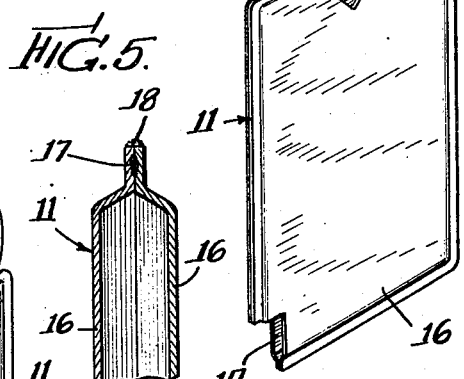
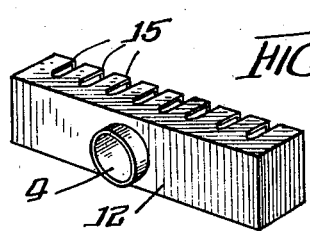
INVENTOR.
Peter Frantz
BY Arthur H. Durand
ATTORNEY.

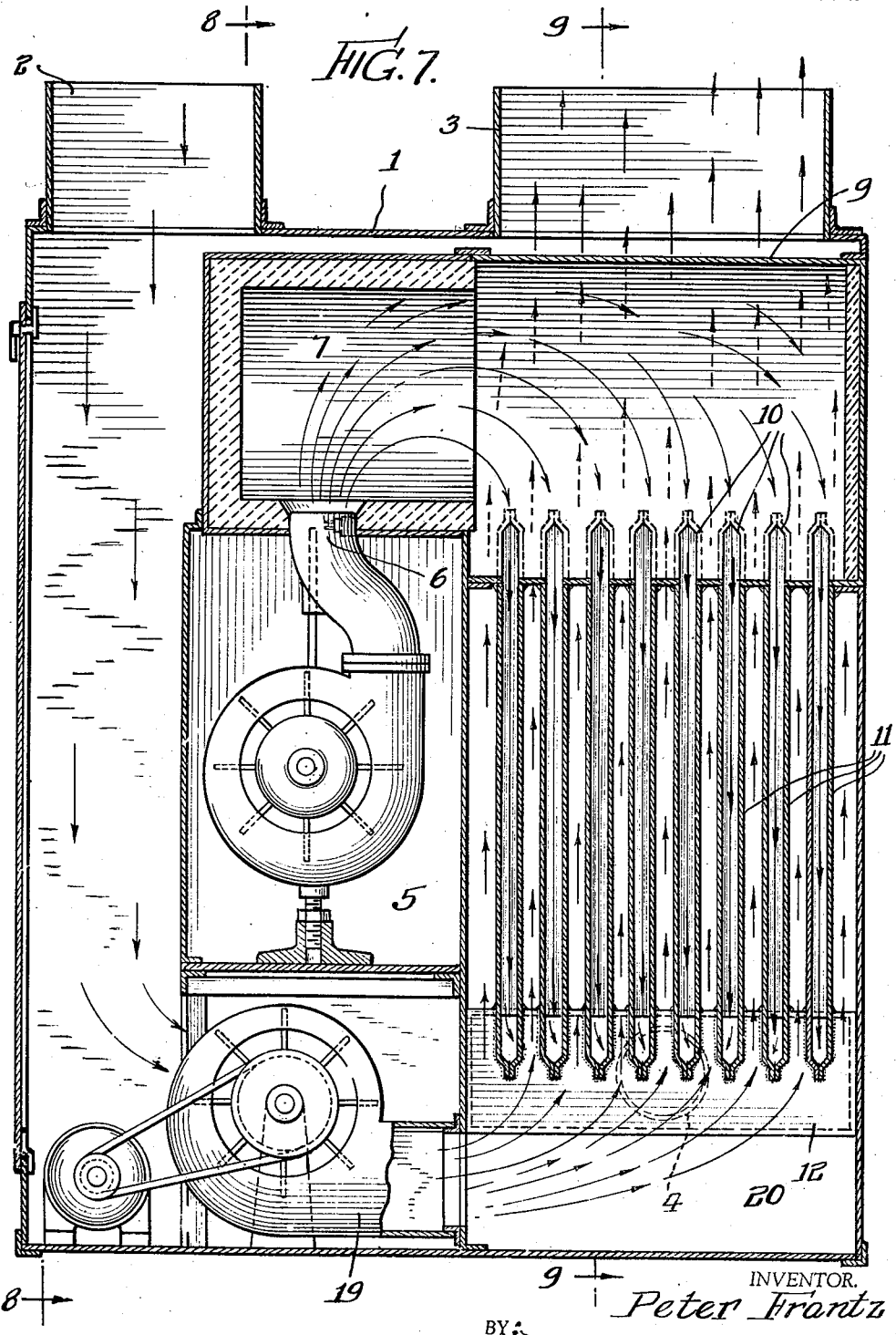

Dec. 30, 1941.   P. FRANTZ   2,267,905
HEATING APPARATUS
Filed Dec. 4, 1939   3 Sheets-Sheet 3

INVENTOR.
Peter Frantz
BY Arthur H. Durand
ATTORNEY.

Patented Dec. 30, 1941

2,267,905

UNITED STATES PATENT OFFICE 2,267,905

HEATING APPARATUS

Peter Frantz, Sterling, Ill.

Application December 4, 1939, Serial No. 307,407

22 Claims. (Cl. 126—110)

This invention relates to heating apparatus, for heating houses and buildings, and more particularly to hot air heating systems for this purpose.

Generally stated, the object of the invention is to provide a novel and improved construction and arrangement whereby the incoming cold air, in effect, meets the outgoing and more or less spent gases and products of combustion, so that any heat left in said gases is absorbed by the incoming cold air, thereby to reduce or minimize the temperature in the stack or chimney of the building, and thus reduce the consumption of fuel and increase the efficiency of the apparatus.

It is also an object to provide certain details of construction and features and combinations tending to increase the general efficiency and desirability of a hot air heating system of this particular character.

To the foregoing and other useful ends, the invention consists in matters hereinafter set forth and claimed and shown in the accompanying drawings, in which—

Fig. 1 is a perspective of a hot air heating furnace embodying the principles of the invention.

Fig. 2 is a perspective of the hollow sections and the top and bottom headers thereof, through which hot gases or products of combustion pass downwardly to heat the air passing upwardly between the flat sections.

Fig. 3 is a perspective of the two plates or halves of one of said hollow sections.

Fig. 4 is a perspective showing the two plates secured together at their edges.

Fig. 5 is a detail fragmentary section of a portion of one of the hollow sections.

Fig. 6 is a perspective of the lower or off-take header.

Fig. 7 is an enlarged vertical section on line 7—7 in Fig. 1 of the drawings.

As thus illustrated, the invention comprises a rectangular casing 1 of sheet metal or any other suitable or desired material. As shown, this casing has a cold air inlet 2 at the top thereof, and also has a hot air outlet 3 at said top, and the side of the casing has a stack or chimney 4 that carries off the more or less spent gases and products of combustion.

Figure 8:
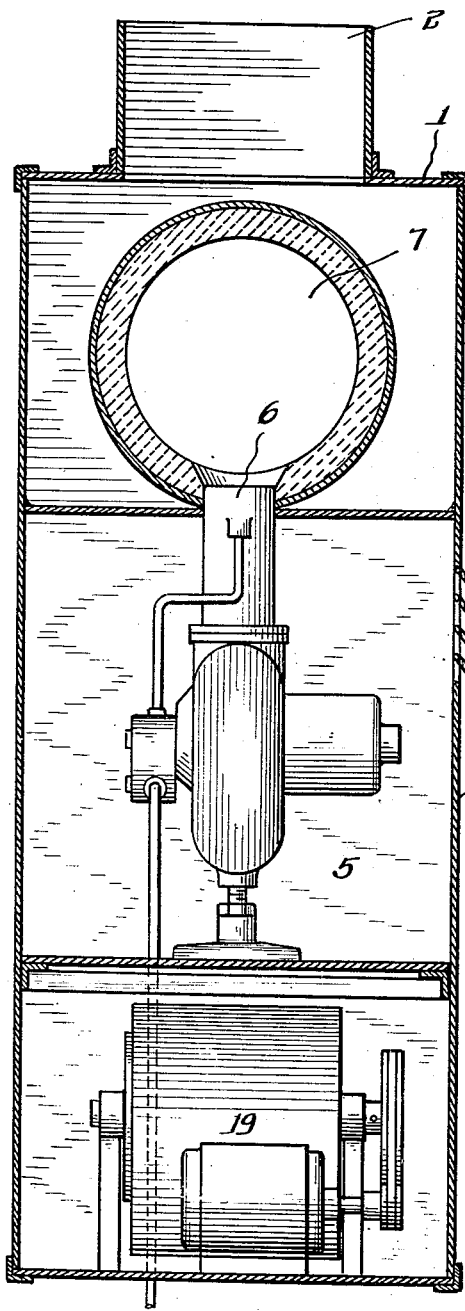
Fig. 8 is a vertical section on line 8—8 in Fig. 7 of the drawings.

For the broader purposes of the invention, it will be understood that any sort of fuel can be employed, with any kind of burner that is suitable for the purpose, but in said drawings a chamber 5 is provided, and an oil burner 6, of any suitable or desired character, is enclosed in said chamber to discharge the flame thereof upwardly into the combustion chamber 7 above, this combustion chamber being preferably lined with clay or firebrick or other heat-resisting material. To feed air to the fan of said burner, louvres 8 may be provided in the side wall of the casing, as shown more clearly in Fig. 8 of the drawings.

The heat absorption instrumentalities comprise the cylindrical upper header 9, being of any suitable or desired material, having slots 10 in the lower side thereof, it being observed that these slots will feed the hot gases and products of combustion to the upper ends of the hollow, flat sections 11, and from the latter the more or less spent gases and products of combustion will be discharged through the lower header 12 into the said stack or chimney 4 previously mentioned. To receive the upper header 9, the upper edge of each hollow section 11 is provided with a notch 13, to the edges of which latter the header is welded or otherwise secured. Each section 11 has its lower corner portion provided with a notch 14, and the latter has its edges welded or otherwise secured to the edges of the slots 15 in the bottom or lower header 12 previously mentioned. Thus, the heat absorption unit comprises an upper inlet header, a plurality of hollow, flat sections spaced apart, and a lower or outlet header, all preferably formed and constructed as shown in the drawings. In the making of the sections 11, each section may comprise two flat plates 16, as shown in Fig. 3 of the drawings, and these flat plates may have marginal portions which are spot-welded or otherwise sealed together at 17, and the edges of the hollow sections may be sealed at 18 in a suitable or desired manner.

Figure 9:
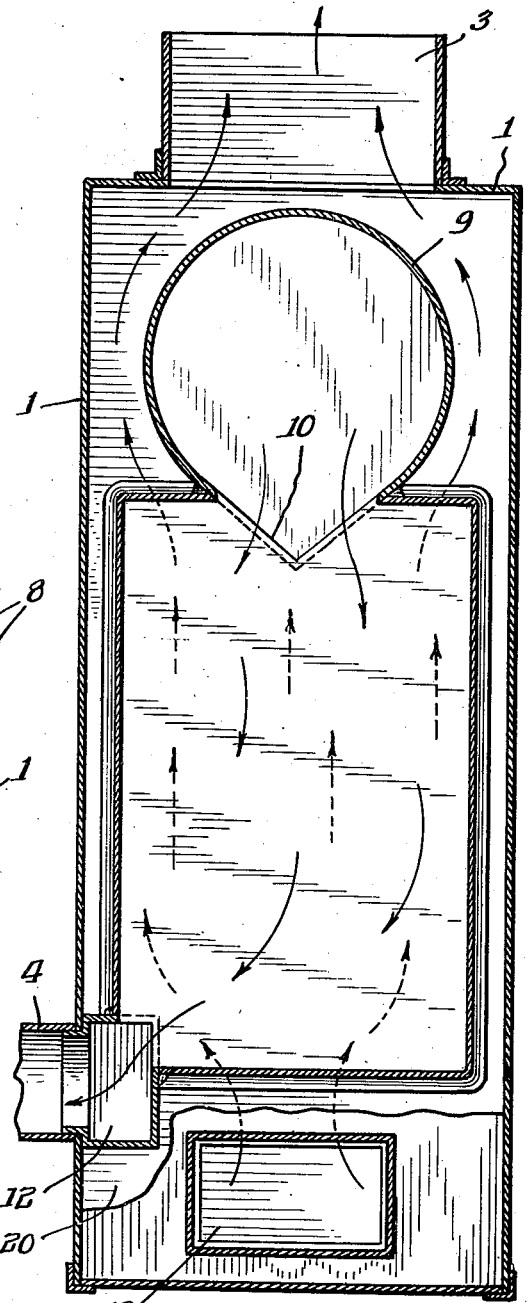
Fig. 9 is a vertical section on line 9—9 in Fig. 7 of the drawings.

For the purpose of forcing the cold air upwardly between the sections 11, a suitable fan or blower 19 may be provided, as shown in Fig. 7 of the drawings, to blow the cold air into the chamber 20, from which latter the air is then free to rise between the hollow sections 11 previously described, as indicated in Figs. 7 and 9 of the drawings, it being observed that the air that has been heated between the sections 11 passes upwardly at opposite sides of the cylindrical header 9, which latter is the hottest portion of the heat absorption instrumentalities, as it receives the flame directly from the burner. In this way, obviously, the sections 11 and other portions of the heat absorption unit can be so proportioned that practically all of the heat will be absorbed before or at the time that the gases and products of combustion reach the bottom or lowest point of said unit. That is practically true, and if the gases and products of combustion are still hot or fairly warm by the time they reach the bottom of the heat absorption unit, such heat will be immediately absorbed by the cold air in the chamber 20 below the unit. In this way, and by having the incoming cold air practically impinge on the outgoing gases and products of combustion, the temperature in the stack or chimney 4 is greatly reduced, with the result that less fuel is consumed for the heating of any given space in a house or building. In addition, more efficient heating is obtained by causing the outgoing hot air to pass the top or hottest portion of the heating unit, instead of having the incoming cold air impinge directly upon the said hottest portion of the heat absorption unit. And, of course, the speed of the fan 19 will be a factor in the situation, for by increasing its speed, there will be less likelihood of any heat being left in the gases or products of combustion by the time they reach the stack or chimney or other outlet therefor.

As the sections 11 do not circumferentially enclose the header 9, or the header 12, the work and expense of assembling the parts is substantially less, and there are other advantages as well.

While the fluid inlet header 9 may be of any suitable or desired shape, it is practically cylindrical except for its under side, which latter is preferably shaped to fit into the wide V-shaped notches 13 previously described. Also, while the outlet header 12 may be of any suitable or desired shape, it is preferably rectangular, with its inside upper corner portion set into the notches 14 previously mentioned. Thus, in this way, the upper header 9 is located centrally of the heat exchange unit thus formed, but the lower header 12 is preferably offset to one side of said unit, as shown in the drawings, but may be placed at any point along the bottom edges of sections 11 of said unit.

It is important to observe that the imperforate top walls and side walls of the header 9 serve as a super-heater to intensely heat the air immediately before it escapes from the heating apparatus. Again, it is important that the burner or heating element is not inside the unit shown in Fig. 2 of the drawings and hence that the liability of any portion of the unit burning out is greatly minimized, if not entirely prevented. In addition, the bottom of the header 12 is imperforate, and each header is rigid and continuous from end to end and the two parallel headers serve as the only means for rigidly connecting the vertical hollow members 11 together to form a structural unit which can be installed as such in the casing of the apparatus. Again, it should be observed that the V-formation of the slotted bottom of the header 9, and the V-formation of the notches 13, tends to insure accuracy in the assembling together of the header and the hollow members 11, as such formation prevents the header 9 from rotating about its axis before it is fastened to the said vertical flat members. The same also is true of the bottom header, in the fastening thereof to the lower portions of the hollow vertical members. Thus, the two headers and the hollow vertical members fit accurately together and can be welded or otherwise fastened together at their edges, with assurance of perfect accuracy of registration as between the slots in the headers and the inlet and outlet notches of the vertical hollow members that are spaced apart to permit the air to pass upwardly between them.

Thus the hollow sections 11 are not connected together before the headers 9 and 12 are welded thereto. In fact, the said headers form the primary and only connections between the said hollow sections. The notches in the sections have straight converging edges, and the slots 10 in the bottom of the upper header have similar edges. Thus no part of the hollow sections forms any part of either header. Each header is complete and separate in itself before being incorporated in the heat exchange unit.

It is important to observe that the plates 16 of each section of the heat exchange unit are rectangular and perfectly flat, so that the space between them extends practically for the full area of each section, the two plates being connected only at their extreme outer edges, and as each plate is preferably smooth and flat it follows that these plates may be pressed into form from sheet metal in a comparatively inexpensive manner. The header 12 bulges horizontally and downwardly from the lower corners of the sections, by reasons of the notches 14 which cut out the corners, and the upper header 9 has its sides spaced from the walls of the casing 1 as shown in Fig. 9 of the drawings, so that the upwardly moving current of air is held against the sides of this upper header. The transverse width of the lower header 12 is substantially less than the transverse width of the upper header 9, as the heat has practically been taken out of the products of combustion before they reach the header 12, so that the latter does not need to act as a radiator from which the air can absorb heat. But it is important for the upper header 9 to act as a radiator, to enable the fast moving column of air to absorb heat therefrom, for this is where the maximum temperature of the heat exchange unit is found, and hence the air is more intensely heated here than elsewhere.

What I claim as my invention is:

1. In a hot air heating apparatus, the combination of a plurality of substantially flat hollow sections spaced apart and disposed in parallel vertical planes, an intake header closed at one end and open at the other and extending continuously from end to end and supported on the upper edges of said hollow sections, a combustion chamber entirely outside of the sections and communicating with the interior of said header, at the open end of the latter, so that the hot gases and products of combustion are forced downwardly through said hollow sections, the latter each having an inlet at the upper edge thereof, with slots communicating with each inlet at the bottom of the header, and with the horizontal axis of the intake header substantially above the upper edges of the sections, a lower or outlet header extending continuously from end to end and disposed horizontally and provided with slots in communication with openings in the lower edges of said hollow sections, the sections being each separately formed and rigidly spaced apart by their edgewise attachment with said headers, and means for forcing cold air upwardly past said lower header and between the hollow sections and around said upper header, the latter extending a substantial distance above the upper edges of the hollow sections to provide a relatively large heat radiating and air deflecting surface of maximum temperature.

2. A structure as specified in claim 1, said upper header being substantially cylindrical except for its bottom portion, which latter is V-shaped to fit the V-shaped notches formed in the upper edges of the hollow sections, holding the header against rotary displacement during the assembly thereof, and deflecting and dividing the air equally.

3. A structure as specified in claim 1, said lower or outlet header being set into notches formed in the lower corners of the hollow sections, the latter having lower edges which are disposed a substantial distance above the bottom of said outlet header.

4. A structure as specified in claim 1, each hollow section comprising a pair of flat and substantially rectangular plates fastened together and sealed at their edges, so that the space between the two plates forms a down draft flue for the hot gases and products of combustion.

5. A structure as specified in claim 1, comprising a burner disposed below said combustion chamber, the latter receiving the flame of the burner, and the hot gases and products of combustion then passing from the open end of said combustion chamber into the adjacent open end of the upper header.

6. A structure as specified in claim 1, comprising a burner disposed below said combustion chamber, the latter receiving the flame of the burner, and the hot gases and products of combustion then passing from the open end of said combustion chamber into the adjacent open end of the upper header, means at the inner side of the heat absorption unit to form a chamber for said burner, and a casing providing space directly below said burner for a fan or blower for the incoming cold air.

7. A structure as specified in claim 1, said upper header being substantially cylindrical and being set into engaging upper edges of the hollow sections.

8. A structure as specified in claim 1, said lower or outlet header being set into notches formed in the lower corners or bottom edges of the hollow sections, the latter having lower edges which are disposed a substantial distance above the bottom of said outlet header.

9. A structure as specified in claim 1, comprising a burner disposed preferably directly below said combustion chamber, the latter receiving the flame of the burner, and the hot gases and products of combustion then passing from the open end of said combustion chamber into the adjacent open end of the upper header.

10. A structure as specified in claim 1, comprising a burner disposed preferably directly below said combustion chamber, the latter receiving the flame of the burner, and the hot gases and products of combustion then passing from the open end of said combustion chamber into the adjacent open end of the upper header, means at the inner side of the heat absorption unit to form a chamber for said burner, and a casing providing space directly below said burner for a fan or blower for the incoming cold air.

11. A heat exchange unit comprising substantially flat hollow sections spaced apart and disposed in parallel planes, an inlet header entirely outside and engaging the hollow sections at one edge thereof, so that the header is in communication with the interior of each hollow section, but said sections forming no part of either header, the latter being complete before being attached to said sections, and an outlet header parallel with said other header and engaging another edge of each hollow section, so that fluid may pass from said first-mentioned header and through practically the entire length of each hollow section before escaping into said outlet header, the transverse width of each header being less than the width of the sections, with the width of the inlet header substantially greater than the width of the outlet header, each section being separably formed and entirely unconnected with anything else before said headers are applied thereto, and the sections being thus rigidly spaced apart by their attachment to said headers, the two headers each complete in itself forming the only means for rigidly connecting together the hollow sections, and the unit thus formed by the sections and the two headers being supported in a fluid receiving and discharging enclosure, with the sides of the inlet header spaced from the sides of the enclosure.

12. A structure as specified in claim 11, said first-mentioned header being substantially cylindrical and being set into engaging edges of the hollow sections.

13. A structure as specified in claim 11, said outlet header being only partially set into the corner of said hollow sections, by notching out the corner, leaving the major portion of said outlet header outside the area of the sections, so that this header bulges away from the outer edges of the sections.

14. A structure as specified in claim 11, comprising means for forcing heated fluid into said inlet header, and means for forcing unheated fluid between the hollow sections and around the inlet header.

15. A structure as specified in claim 11, said inlet header being located centrally of the heat exchange unit, but said outlet header being offset to one side of said unit, by notching out the corner, leaving the major portion of said outlet header outside the area of the sections, so that this header bulges away from the outer edges of the sections.

16. A structure as specified in claim 11, said outlet header being set into the corners or on bottom edges of said hollow sections, by notching out the corner, leaving the major portion of said outlet header outside the area of the sections, so that this header bulges away from the outer edges of the sections.

17. A structure as specified in claim 11, said inlet header being located centrally of the heat exchange unit, but said outlet header being placed at any desired point on the lower end of the sections, by notching out the corner, leaving the major portion of said outlet header outside the area of the sections, so that this header bulges away from the outer edges of the sections.

18. A heating apparatus having a rigid hollow structure that can be installed as a unit in a casing, said unit comprising a horizontal top header formed separately in complete form and adapted to be closed at one end and to receive heat and products of combustion through its other end, the top and sides of said header being imperforate, while its integral under side is formed with transverse spaced slots, a plurality of vertical parallel flat hollow members spaced apart to prevent any interengagement between them and having their upper edges provided with inlets adapted to register with said slots, when the complete and separately formed header is placed upon said members, the edges of the slots being welded to the edges of said inlets, the lower portions of said members having outlets, a horizontal bottom header having spaced lateral inlets registering with and having their edges welded to the edges of said outlets, said bottom header having an outlet and having an imperforate under side, and means for supplying air upwardly between said members and over the sides and top of said top header, the transverse width of the outlet header being substantially less than the width of the inlet header, means for holding the current of air against the sides of said inlet header, so that the latter serves as a super heater for intensely heating the air immediately before it escapes from said casing, said members forming no part of either header, and said headers forming the primary and only means for rigidly connecting said members together.

19. A structure as specified in claim 18, a horizontal fire pot forming a combustion chamber opening into one end of said top header, the other end of the latter being closed against said casing, a burner immediately below said fire pot, projecting flame and products of combustion upwardly into the same, and a blower below said burner to force the air upwardly between said members, said casing having a hot air outlet immediately above said top header, and having a cold air inlet opening into the casing in rear of the closed end of said fire pot, so that the cold air passes downwardly behind the fire pot and burner to said blower.

20. A structure as specified in claim 18, said top header being V-shaped on its bottom and said members having V-shaped notches engaging the bottom of said top header, so that the top header is easily centered for attachment to said members, but said members forming no part of either header.

21. A structure as specified in claim 18, said top header being V-shaped on its bottom and said members having V-shaped notches engaging the bottom of said top header, so that the top header is easily centered for attachment to said members, and said members having their lower ends formed with notches forming outlets engaging said bottom header, but said members forming no part of either header.

22. A structure as specified in claim 18, said members each comprising a pair of plates spaced apart and having their parallel flat walls welded together at their meeting edges.

PETER FRANTZ.